US012781791B2

(12) United States Patent
Iuga et al.

(10) Patent No.: US 12,781,791 B2
(45) Date of Patent: Nov. 3, 2026

(54) TRIM TAB ACTUATOR ASSEMBLIES AND BRACKETS AND METHODS THEREOF

(71) Applicant: Brunswick Corporation, Mettawa, IL (US)

(72) Inventors: Ioan Iuga, Caledonia, MI (US); John Witte, Ada, MI (US)

(73) Assignee: Brunswick Corporation, Mettawa, IL (US)

( * ) Notice: Subject to any disclaimer, the term of this patent is extended or adjusted under 35 U.S.C. 154(b) by 488 days.

(21) Appl. No.: 18/479,329

(22) Filed: Oct. 2, 2023

(65) Prior Publication Data

US 2025/0109768 A1 Apr. 3, 2025

(51) Int. Cl.
*F16C 11/04* (2006.01)
*B63B 39/06* (2006.01)

(52) U.S. Cl.
CPC .......... *F16C 11/045* (2013.01); *B63B 39/061* (2013.01)

(58) Field of Classification Search
CPC ....... B63B 39/00; B63B 39/06; B63B 39/061; B63H 20/00; B63H 20/08; B63H 20/10; F16C 11/00; F16C 11/04; F16C 11/045; F16C 11/06; F16C 11/0614
USPC ....... 114/271, 273, 274, 275, 280, 282, 284, 114/285, 286
See application file for complete search history.

(56) References Cited

U.S. PATENT DOCUMENTS 4,967,682 A * 11/1990 O'Donnell ............ B63B 39/061 114/286
6,095,077 A * 8/2000 DeAgro ................ B63B 39/061 114/286
7,128,014 B2 10/2006 Berthiaume
8,631,753 B2 * 1/2014 Morvillo ............... B63B 39/061 440/40
10,040,522 B1 * 8/2018 Hartman ................. B63B 34/75
10,112,688 B1 10/2018 Hartman et al.
10,358,195 B1 * 7/2019 Langlois ............... B63B 39/061
10,994,807 B2 * 5/2021 Langlois ................... B63B 1/32
12,124,276 B2 * 10/2024 Chan .................... G05D 1/0875
12,368,401 B1 7/2025 Deuel
12,384,498 B2 * 8/2025 Isiminger .............. B63B 39/061

FOREIGN PATENT DOCUMENTS

CA 2568275 A1 6/2007

OTHER PUBLICATIONS

Extended European Search Report in European Application No. 24201989.1, dated Mar. 5, 2025, 10 pages.
Office Action in European Application No. 24 201 989.1, dated Feb. 12, 2026, 5 pages.

* cited by examiner

*Primary Examiner* — Daniel V Venne
(74) *Attorney, Agent, or Firm* — Andrus Intellectual Property Law, LLP

(57) ABSTRACT

A bracket for coupling an actuator assembly having a first rod and a second rod to a pivotable component of a marine vessel comprises a main body with a first end configured to be pivotally coupled to the first rod and an opposite second end configured to be pivotally coupled to the second rod. The main body pivots about at least one axis to thereby facilitate equal loading of the first rod and the second rod, and a linking member is pivotally coupled to the main body and is configured to be coupled to the pivotable component.

18 Claims, 7 Drawing Sheets

TRIM TAB ACTUATOR ASSEMBLIES AND BRACKETS AND METHODS THEREOF

FIELD

The present disclosure relates to trim tab assemblies on marine vessels and particularly to trim tab actuator assemblies and brackets and methods thereof.

BACKGROUND

U.S. patent application Ser. No. 17/716,542, filed Apr. 8, 2022, which is incorporated herein by reference in its entirety, discloses an electric linear actuator having a housing extending along a longitudinal axis. A spindle is provided in the housing and extends along the longitudinal axis. A rod is coaxially coupled to the spindle and extends from a proximal end located in the housing to a distal end located outside the housing. The rod is movable along the longitudinal axis in response to rotation of the spindle. A circuit board is located in the housing adjacent the proximal end of the rod. The circuit board includes a linear inductive sensor having a linear axis oriented parallel to the longitudinal axis. The linear inductive sensor senses an actual position of the proximal end of the rod.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a bracket for coupling an actuator assembly having a first rod and a second rod to a pivotable component of a marine vessel comprises a main body with a first end configured to be pivotally coupled to the first rod and an opposite second end configured to be pivotally coupled to the second rod. The main body pivots about at least one axis to thereby facilitate equal loading of the first rod and the second rod, and a linking member is pivotally coupled to the main body and is configured to be coupled to the pivotable component.

According to some aspects, the pivotable component is a trim tab.

According to some aspects, the linking member is a clevis.

According to some aspects, the main body pivots about a first main axis, the first end is coupled to the first rod at a first end axis and the second end is coupled to the second rod at a second end axis, and the first main axis, the first end axis, and the second end axis are parallel to and spaced apart from each other.

According to some aspects, the bracket further comprises a mounting bracket configured to pivotally couple the linking member to the pivotable component.

According to some aspects, the at least one axis comprises two axes and the main body pivots about the two axes to thereby facilitate equal loading of the first rod and the second rod.

According to some aspects, the two axes comprise a first main axis and a second main axis that is transverse to the first main axis, the first end is coupled to the first rod at a first end axis and the second end is coupled to the second rod at a second end axis, and the first main axis, the first end axis, and the second end axis are parallel to and spaced apart from each other.

According to some aspects, the first main axis is perpendicular to the second main axis.

According to some aspects, the linking member is an eyebolt.

According to another example of the present disclosure, an actuator assembly for pivoting a trim tab of a marine vessel comprises a first rod and a second rod configured to pivot the trim tab with respect to the marine vessel and a bracket having a main body with a first end pivotally coupled to the first rod and an opposite second end pivotally coupled to the second rod. The main body pivots about at least one axis to thereby facilitate equal loading of the first rod and the second rod. A linking member is pivotally coupled to the main body and is further coupled to one of the trim tab and the marine vessel.

According to some aspects, the actuator assembly further comprises a first housing from which the first rod extends and a second housing from which the second rod extends.

According to some aspects, the bracket is a first bracket and a second bracket is configured to pivotally couple the first and second housings to the other of the trim tab and the marine vessel.

According to some aspects, the linking member is a clevis.

According to some aspects, the main body pivots about a first main axis, the first end is coupled to the first rod at a first end axis and the second end is coupled to the second rod at a second end axis, and the first main axis, the first end axis, and the second end axis are parallel to and spaced apart from each other.

According to some aspects, the bracket further comprises a mounting bracket configured to pivotally couple the linking member to the one of the trim tab and the marine vessel.

According to some aspects, one or more position sensors sense a first position of the first rod and a second position of the second rod, and a control system is configured to independently control movement of the first rod and the second rod based on the sensed first position of the first rod and the sensed second position of the second rod.

According to some aspects, the at least one axis comprises two axes and the main body pivots about the two axes to thereby facilitate equal loading of the first rod and the second rod.

According to some aspects, the two axes comprise a first main axis and a second main axis that is transverse to the first main axis, the first end is coupled to the first rod at a first end axis and the second end is coupled to the second rod at a second end axis, and the first main axis, the first end axis, and the second end axis are parallel to and spaced apart from each other.

According to some aspects, the first main axis is perpendicular to the second main axis.

According to some aspects, the linking member is an eyebolt.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
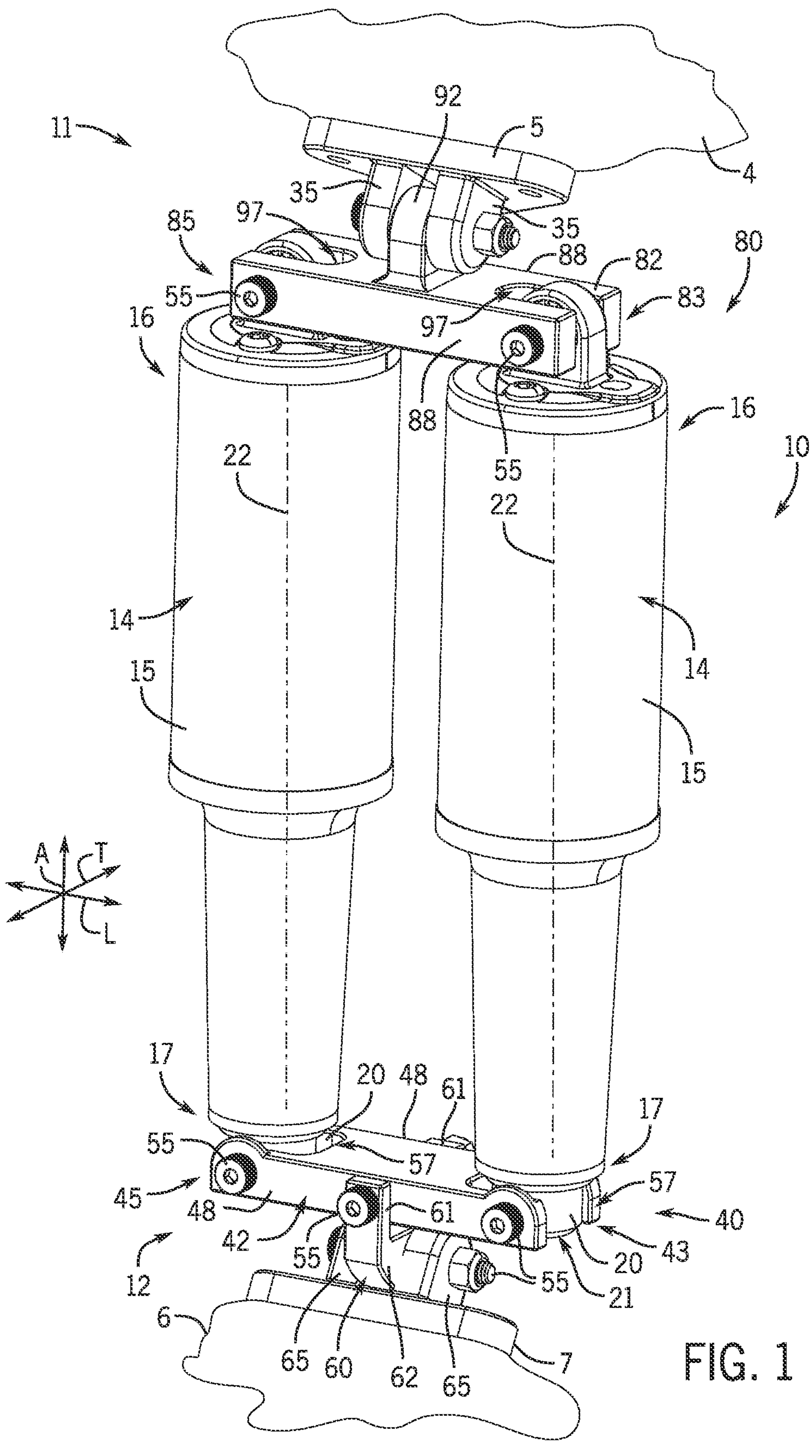
FIG. 1 is a perspective view of an example actuator assembly according to the present disclosure.

FIG. 1 depicts a perspective view of an example actuator assembly 10 according to the present disclosure. The actuator assembly 10 generally has a top first end 11 configured to be coupled to a hull or transom of a marine vessel 4 (a portion of which is schematically depicted in FIG. 1) and an opposite bottom second end 12 configured to be coupled to a trim tab 6 (a portion of which is schematically depicted in FIG. 1). The trim tab 6 is pivotally coupled to the hull or transom of the marine vessel 4 via a hinge (not depicted). In operation, the actuator assembly 10 actuates to pivot the trim tab 6 relative to the transom or hull of the marine vessel 4 into the water stream created as the marine vessel moves through water to vary the hydrodynamic forces acting on the marine vessel 4. The operator of the marine vessel 4 may desire to vary the hydrodynamic forces to change steering/turning conditions of the marine vessel 4 and/or generate a desired wake behind the marine vessel 4.

The actuator assembly 10 includes at least two or more actuators 14 (e.g., linear actuators) that are pivotably coupled between opposing brackets, namely a lower first bracket 40 and an upper second bracket 80 (described in greater detail hereinbelow). Note that while the example actuator assemblies 10 described herein below describe the first bracket 40 coupling the actuator assembly 10 to the trim tab 6 and the second bracket 80 coupling the actuator assembly 10 to the marine vessel 4, in other examples the first bracket 40 couples the actuator assembly 10 to the marine vessel 4 and the second bracket 80 couples the actuator assembly 10 to the trim tab 6. Further note that while the example actuator assemblies 10 and/or brackets 40, 80 are described herein with reference to trim tabs 6, the actuator assemblies 10 and/or brackets 40, 80 of the present disclosure can be utilized with other components of the marine vessel 4, such as hatch lifts, seating tables, side panels of the marine vessel, an outboard motor, a jack plate, windows, windshield vents, and the like.

The actuators 14 have a generally parallel orientation with respect to each other. Each actuator 14 has a housing 15 with a first housing end 16 and an opposite second housing end 17 and a rod 20. The rod 20 extends from the second housing end 17 and is actuatable to extend from and retract into the housing 15 along a rod axis 22 in any suitable manner known in the art. In one example, the actuator 14 is an electric linear actuator having a motor, gearset, and spindle, which together work to extend the rod 20 out of the housing 15 or retract the rod 20 into the housing 15 in response to operator commands (e.g., from a trim switch). Optionally, the actuator assembly 10 includes a cover (not depicted) that covers and protects the actuators 14 from damage.

In operation, the rod 20 extends from the housing 15 to pivot the trim tab 6 away from the marine vessel 4. The rod 20 retracts into the housing 15 to pivot the trim tab 6 toward the marine vessel 4. Note that while it is possible for a single actuator 14 to be utilized to pivot the trim tab 6, the present inventors, through research and observations, recognized that utilizing two or more actuators 14 provides unique advantages in comparison to assemblies with only one actuator. For example, utilizing two actuators 14 increases the total force that may be applied by the actuators 14 to pivot the trim tab 6. In other examples, utilizing two less-powerful actuators 14 may be more cost-effective than utilizing one relatively more-powerful actuator. In still other examples, using two relatively smaller actuators 14 occupies less space and/or is lighter than utilizing one relatively larger actuator that occupies a large amount of space and/or is heavier.

The present inventors further recognized that conventional actuator assemblies having two actuators have disadvantages that affect the life of the actuators and/or the efficiency of the actuators. It is generally understood that known actuators cannot be manufactured identically in every way and may have manufacturing tolerances related to rod speed, stroke length, and/or mounting interface, such that two actuators of the same model vary slightly from each other. Thus, when pairing known actuators with each other in a system having two generally parallel actuators coupled to the same trim tab, the differences and/or inconsistencies between the actuators can lead to unintended consequences and/or disadvantages. For example, one actuator may operate at a slightly different speed than the other actuator. As such, the relatively faster actuator may 'pull' on the relatively slower actuator during operation of the actuators, thereby causing unanticipated forces to be applied to the 'pulled' actuator, which may cause damage and/or decrease the lifetime of at least one of the actuators. Other differences between the actuators can further cause damage and/or lessen the lifetime of the actuators. Some example differences include: one rod may extend further from its respective housing than the other rod extends from its respective housing; differences in gear train backlash; slight variances between the coupling location of each rod end to a member attached to the trim tab; and/or one of the rods may reach its respective zero-stroke position or maximum-stroke position before the other rod reaches its respective zero-stroke position or maximum-stroke position.

In certain examples, the differences between the actuators may cause the actuators to unequally share the total 'load' applied to the actuators. The 'load' is the force transmitted to the actuators from the trim tab, which is acted on by the water as the actuators pivot the trim tab into the water. That is, the water acts on and opposes the movement of the trim tab into the water and thereby a corresponding load (e.g., compression force) is transferred to the actuators. The load opposes axial extension of the rods out of their respective housings and/or biases the rods into their respective housings. The present inventors discovered that the unequal loading of the actuators may decrease the lifetime of the actuators and/or result in failure of at least one of the actuators. In one non-limiting example, the rod of a first actuator extends further from its respective housing than the rod of a second actuator extends from its respective housing, and accordingly the rod of the first actuator receives 70% of the load while the rod of the second actuator receives 30% of the load. As such, the rod of the first actuator may wear faster than the rod of the second actuator and/or may fail depending on the magnitude of the load (e.g., if the load applied to one actuator is greater than the maximum allowable load, the actuator may fail).

Accordingly, through research and experimentation, the present inventors developed the actuator assemblies 10 and components thereof that facilitate equal loading of the rods of the actuators to thereby reduce and/or eliminate the problems noted above.

Figure 2:
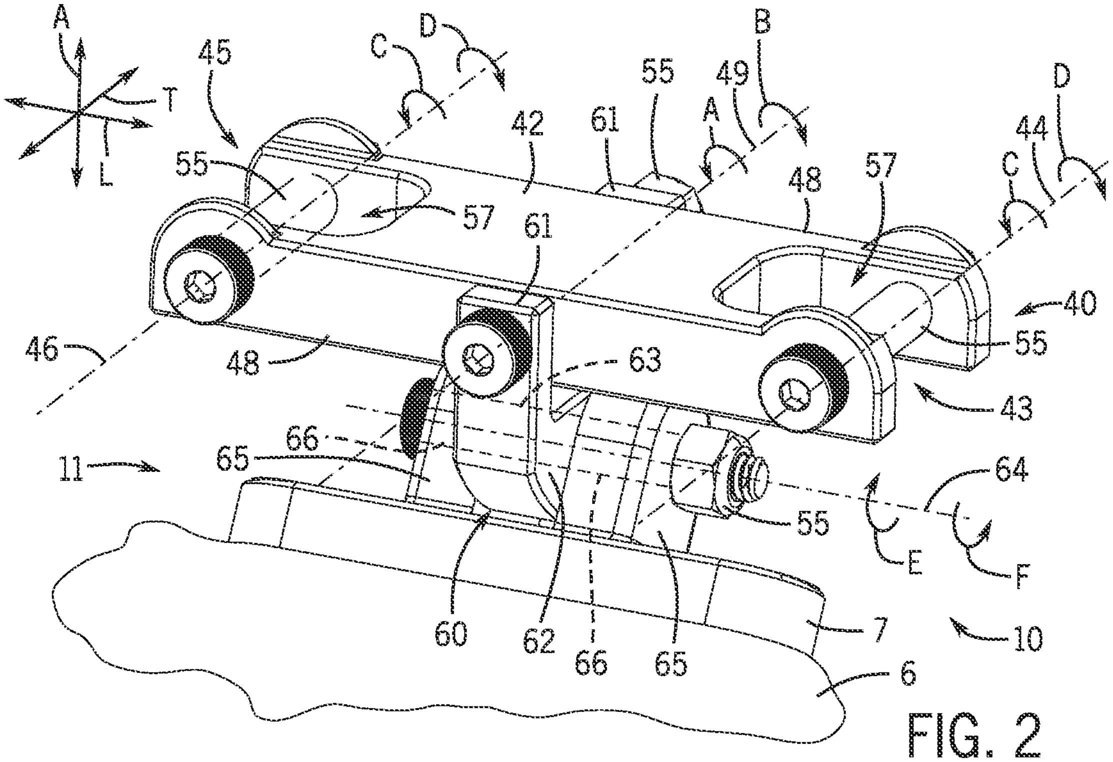
FIG. 2 is a perspective view of a first bracket of the actuator assembly of FIG. 1.

The example first bracket 40 (see also FIG. 2 for greater detail) includes a main body 42 having a first end 43 and an opposite second end 45. The first bracket 40 generally extends longitudinally between the ends 43, 45 (see example axis L) and laterally between opposing sides 48 (see example axis T). The main body 42 defines one or more laterally extending bores 47 (FIG. 4) therein, and the bores 47 laterally extend along axes 44, 46, 49, described in greater detail hereinbelow. The main body 42 also defines cutouts 57 at each end 43, 45 such that the ends 43, 45 are forked ends. In certain examples, the ends 43, 45 pivot about a first main axis 49 (see example arrows A and B). Note that the axes 44, 46, 49 each extend parallel to each other and are longitudinally offset and spaced apart from each other. A fastener 55 (e.g., rod and cotter pin, threaded rod with bolt) is removably inserted into the bore 47 along the first main axis 49 to couple the main body 42 to a linking member 60 of the first bracket 40, as will be described further herein below. Fasteners 55 are also removably inserted into the bores 47 at the ends 43, 45 of the main body 42 along the respective axes 44, 46 to couple the actuators 14 to the main body 42 of the first bracket 40. Specifically, the fasteners 55 couple the rod end 21 of each rod 20 to the ends 43, 45, respectively. As such, the rods 20 (and thus the actuators 14) and the main body 42 pivot relative to each other about the end axes 44, 46 (see arrows C and D), respectively.

As noted, the first bracket 40 includes a linking member 60, which is coupled to the main body 42 with a fastener 55. The linking member 60 can be any suitable component, and in the example depicted in FIG. 2, the linking member 60 is a clevis. The linking member 60 has an arm 61 adjacent to each side 48 of the main body 42 and a body portion 62 from which the arms 61 extend. The linking member 60 and the main body 42 pivot relative to each other about the first main axis 49 (see example arrows A and B).

A bore 63 in the body portion 62 of the linking member 60 (depicted in dashed lines in FIG. 2) longitudinally extends along a linking axis 64. A fastener 55 (e.g., rod and cotter pin, threaded rod with bolt) pivotally couples the linking member 60 to a mounting bracket 7, which is in turn attached to the trim tab 6. The mounting bracket 7 includes a pair of cars 65 with bores 66 therein (depicted in dashed lines in FIG. 2) through which the fastener 55 is received. As such, the linking member 60 and the mounting bracket 7 (and thus the trim tab 6) pivot relative to each other about the linking axis 64 (see example arrows E and F). Note that in other examples, the mounting bracket 7 may be part of the first bracket 40. In these examples, the mounting bracket 7 is coupled to the trim tab 6 in any known manner, such as by fasteners including screws, adhesives, or the like.

Figure 3:
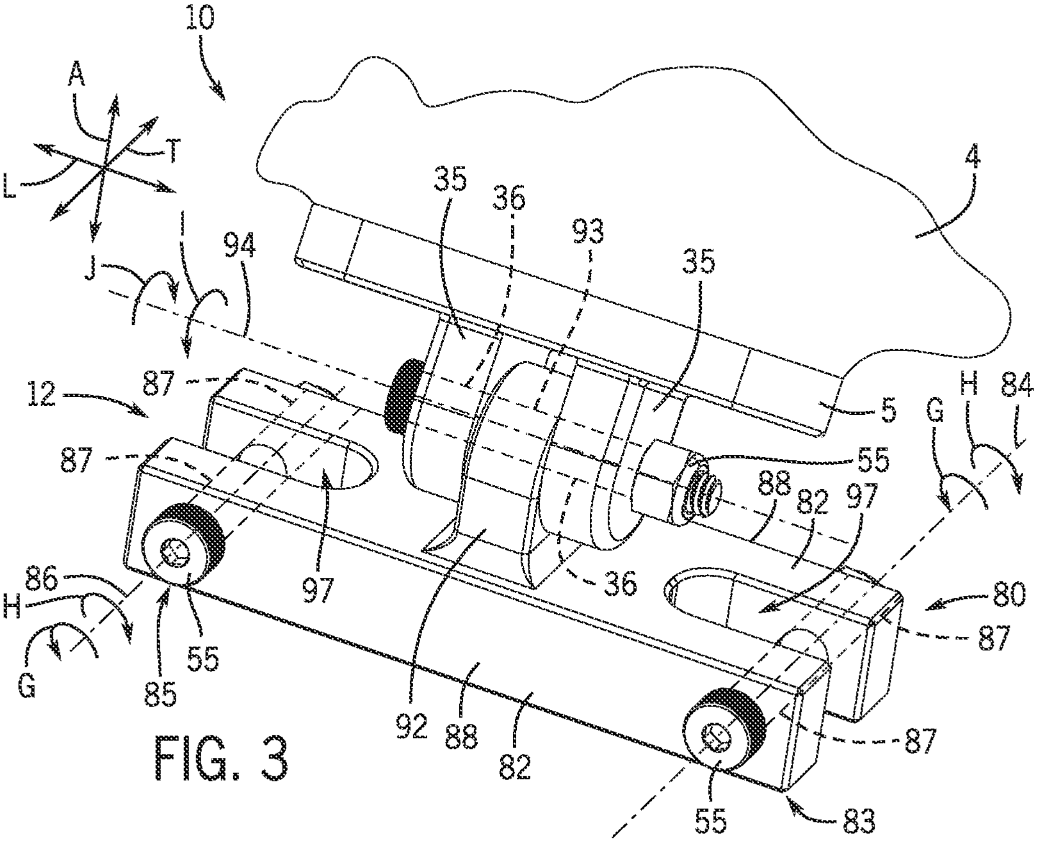
FIG. 3 is a perspective view of a second bracket of the actuator assembly of FIG. 1.

The second bracket 80 (see also FIG. 3 for greater detail) includes a main body 82 having a first end 83 and an opposite second end 85. The second bracket 80 extends generally longitudinally between the ends 83, 85 and laterally between opposing sides 88. The main body 82 defines one or more laterally extending bores 87 therein (depicted in dashed lines in FIG. 3), and the bores 87 laterally extend along axes 84, 86. The main body 82 also defines cutouts 97 at each end 83, 85 such that the ends 83, 85 are forked ends. Note that the axes 84, 86 extend parallel to each other and are longitudinally offset and spaced apart from each other. Note that a fastener 55 (e.g., rod and cotter pin, threaded rod with bolt) is removably inserted into each bore 87 to couple the actuators 14 to the main body 82 of the second bracket 80. Specifically, the fasteners 55 couple the first housing ends 16 (see FIG. 1) to the ends 83, 85, respectively. As such, the actuators 14 and the main body 82 pivot relative to each other about the end axes 84, 86 (see example arrows G and H), respectively.

A tab 92 extends from the main body 82 of the second bracket 80 and defines a bore 93 (depicted in dashed lines in FIG. 3) longitudinally extending along a tab axis 94. The tab 92 is fixed relative to the main body 82. A fastener 55 (e.g., rod and cotter pin, threaded rod with bolt) pivotally couples the tab 92 to a mounting bracket 5, which is in turn attached to the marine vessel 4. The mounting bracket 5 includes a pair of cars 35 with bores 36 therein (depicted in dashed lines in FIG. 3) through which the fastener 55 is received. As such, the main body 82 pivots relative to the mounting bracket 5 (and thus the marine vessel 4) about the tab axis 94 (see example arrows I and J). Note that in other examples, the mounting bracket 5 is part of the second bracket 80. In these examples, the mounting bracket 5 is coupled to the marine vessel 4 in any known manner, such as by fasteners including screws, adhesives, or the like.

Figure 4:
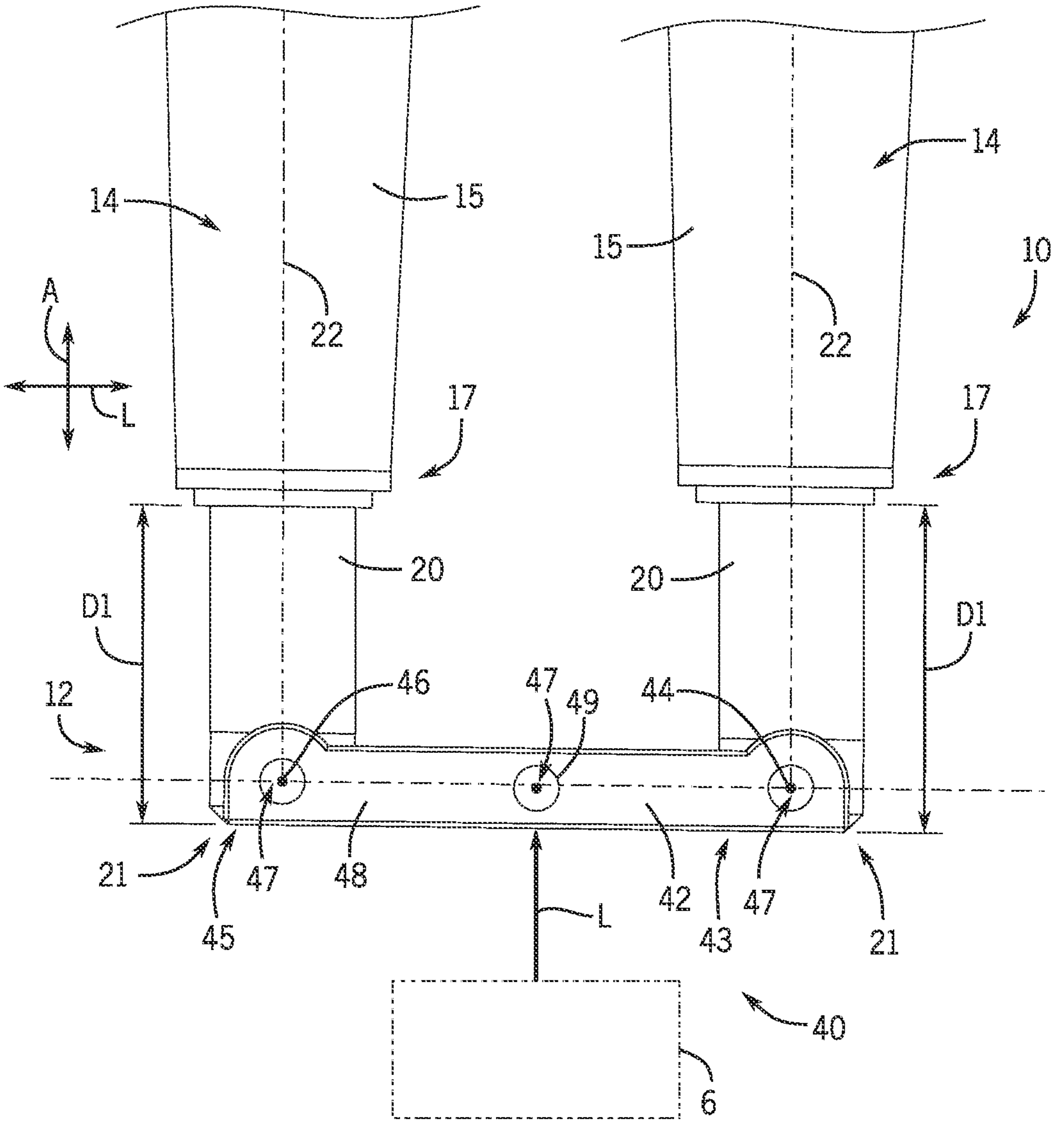
FIGS. 4-5 are schematic partial views of the example actuator assembly according to the present disclosure.
Figure 5:
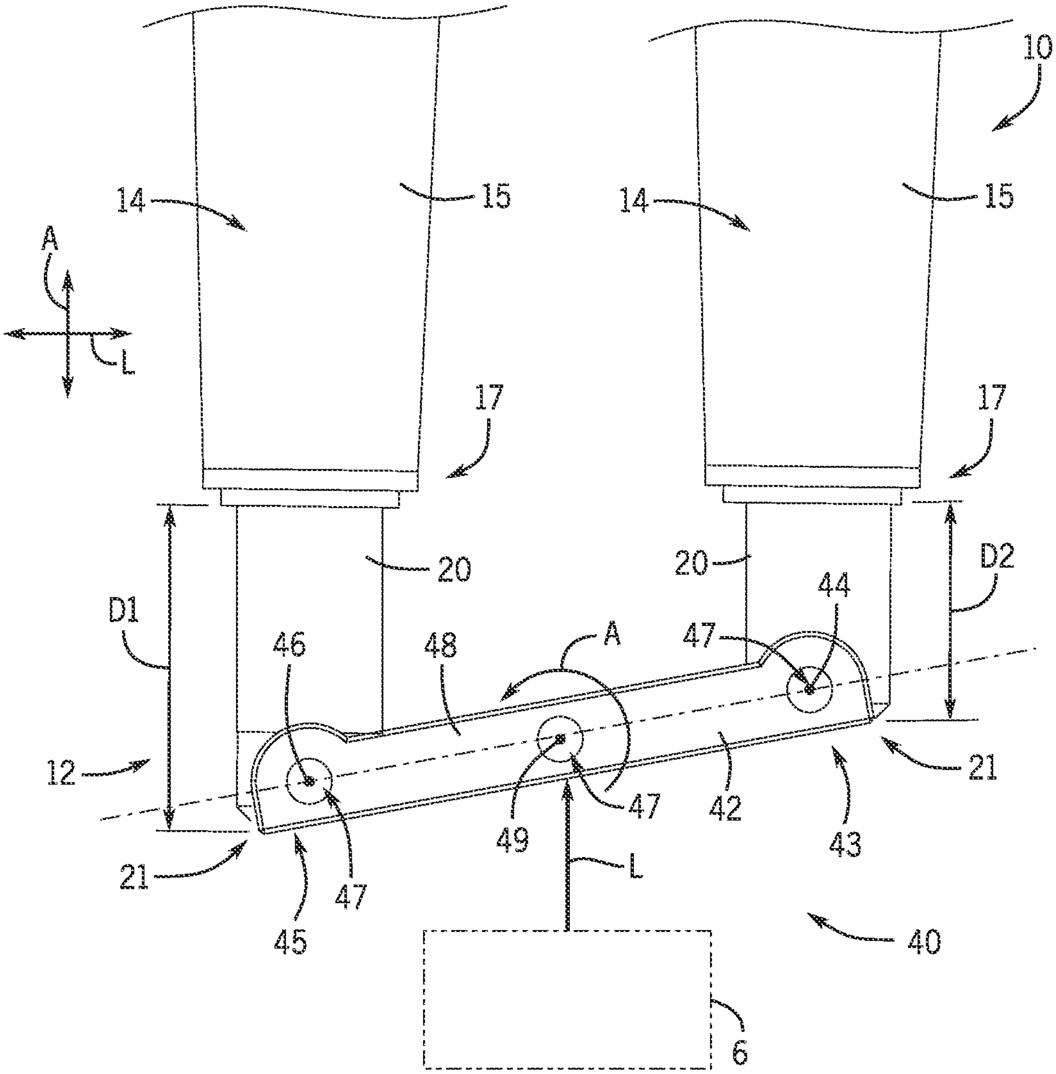

Referring now to FIGS. 4-5, schematic views of a portion of the example actuator assembly 10 according to the present disclosure are depicted. FIG. 4 depicts a theoretical actuation of the actuator assembly 10 to extend the rods 20 from their respective housings 15. Specifically, both rods 20 extend equally by first distances D1 from the second housing ends 17, respectively. As such, the load L applied by the trim tab 6 to the main body 42 of the first bracket 40 is shared and applied equally to the rods 20. In this example, the main body 42 and the linking member 60 do not pivot relative to each other and/or the rods 20.

However, as described above, there may be inconsistencies between the actuators 14 due to the manufacture thereof. Conventional dual-actuator assemblies include two actuators coupled together via the trim tab and/or a conventional bracket that is fixed relative to the trim tab (i.e., does not permit pivoting as the first bracket 40 of the present disclosure pivots). If one of the rods extends a first distance from its housing and the other of the rods extends a second distance that is less than the first distance from its housing, the rod extending the first distance from its housing will have a greater amount of the load (or all of the load) applied thereto in comparison to the other rod extending the second distance from its housing. The unequal loading of the actuators may damage, excessively wear (e.g., due to twisting or frictional forces), and/or cause failure of one or both of the actuators.

Referring now to FIG. 5, the first bracket 40 of the present disclosure is capable of addressing the inconsistencies in the manufacture of the actuators 14 by allowing the main body 42 and/or the linking member 60 to pivot relative to each other and/or relative to the rods 20 such that the load L is equally (or at least closer to equally) applied to each rod 20. FIG. 5 depicts an example actuation similar to the actuation discussed in the preceding paragraph with respect to conventional actuator assemblies. That is, one of the rods 20 extends a first distance D1 from its corresponding second housing end 17 and the other rod 20 extends a second distance D2, which is less than the first distance D1, from its corresponding second housing end 17. The main body 42 pivots (see arrow A) about the first main axis 49 such that the load L applied from the trim tab 6 to the main body 42 of the first bracket 40 is applied equally to both rods 20 even though the rods 20 have different extension distances D1, D2.

Figure 6:
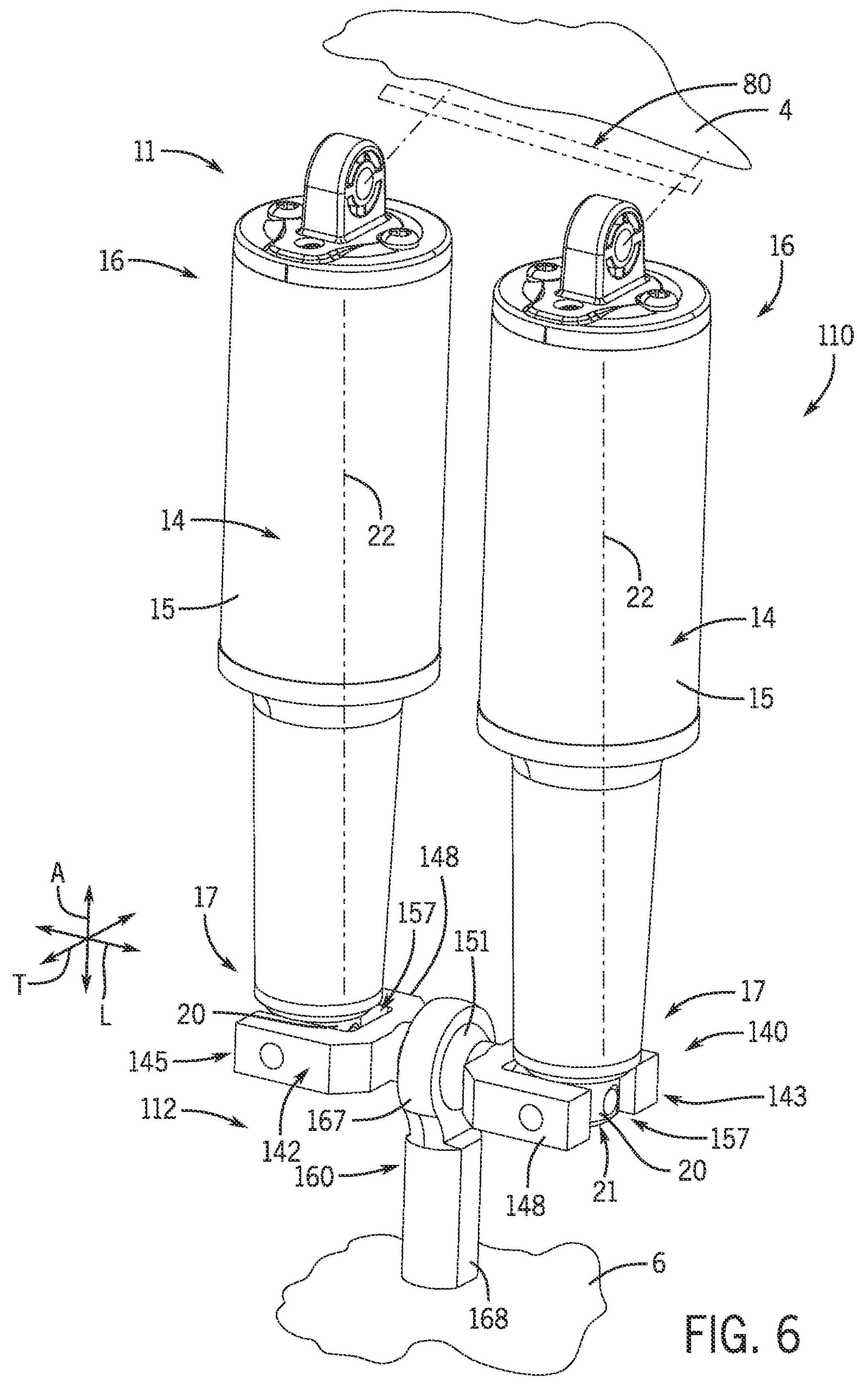
FIG. 6 is a perspective view of another example actuator assembly according to the present disclosure.
Figure 7:
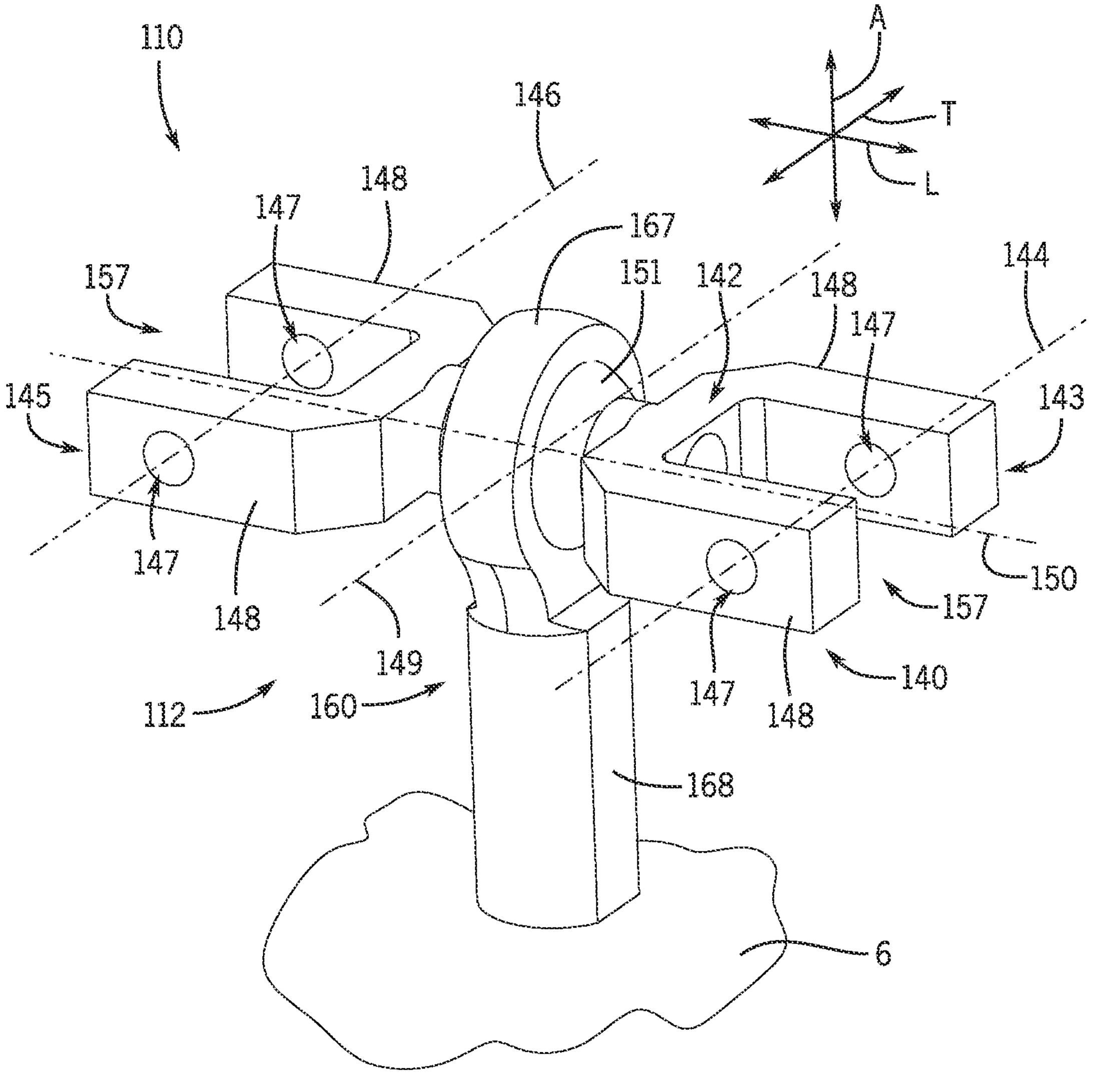
FIG. 7 is a perspective view of a first bracket of the actuator assembly depicted in FIG. 6.

FIGS. 6-7 depict another example actuator assembly 110 according to the present disclosure. Note that the actuator assembly 110 depicted in FIGS. 6-7 can include any of the features and/or components of the actuator assembly 10 depicted in FIGS. 1-5, and the actuator assembly 10 depicted in FIGS. 1-5 can include any of the features and/or components of the actuator assembly 110 depicted in FIGS. 6-7. Components of the actuator assembly 110 not specifically described herein below are analogous in design and function to components of the actuator assembly 10 bearing the same reference numbers in the tens and ones places and will not be described further herein. Further note that the fasteners 55 (see, for example, FIG. 1) are not shown in the example actuator assembly 110 depicted in FIGS. 6-7, but would be provided along the end axes 144, 146 in a manner similar to that shown in FIG. 2.

In this example, the first housing ends 16 of the actuators 14 are coupled to the hull or transom of the marine vessel 4 via a mounting bracket (see for example mounting bracket 5 in FIG. 1) and optionally via a second bracket (see for example second bracket 80 in FIG. 1). The first bracket 140 is coupled to the rod ends 21 of the actuators 14. In another example, the first bracket 140 is coupled between the first housing ends 16 and the hull or transom of the marine vessel 4, while a second bracket (e.g., mounting bracket 5 and/or bracket 80) is coupled between the rod ends 21 of the actuators 14 and the trim tab 6.

The first bracket 140 includes a main body 142 having an integral pivot element 151, for example a ball, positioned between its ends 143, 145. The pivot element 151 defines the first main axis 149 and a second main axis 150 about which the ends 143, 145 pivot. Note that the ends 143, 145 may pivot about one or both axes 149, 150, and the second main axis 150 extends transverse to (e.g., perpendicular to) the first main axis 149. The linking member 160 is coupled to the pivot element 151, and accordingly, the linking member 160 and the main body 142 pivot relative to each other about one or both axes 149, 150. As such, the first bracket 140 is capable of pivoting along more than one axis (i.e., the first and second main axes 149, 150) to equalize the load applied to the rods 20 of the actuators 14 as described above with respect to the example depicted in FIGS. 1-5. In certain examples, the pivoting of the main body 142 about first and second main axes 149, 150 generally provides similar reaction to the load as the pivoting about the first main axis 49 and the linking axis 64 of the first bracket 40 depicted in FIGS. 1-5. In certain examples, the linking member 160 has an eyelet 167 that engages the pivot element 151 and a linking arm 168 that couples to the trim tab 6. In certain examples, the linking member 160 is an eyelet 167 and the pivot element 151 is ball such that the first bracket 140 includes a swivel joint.

Figure 8:
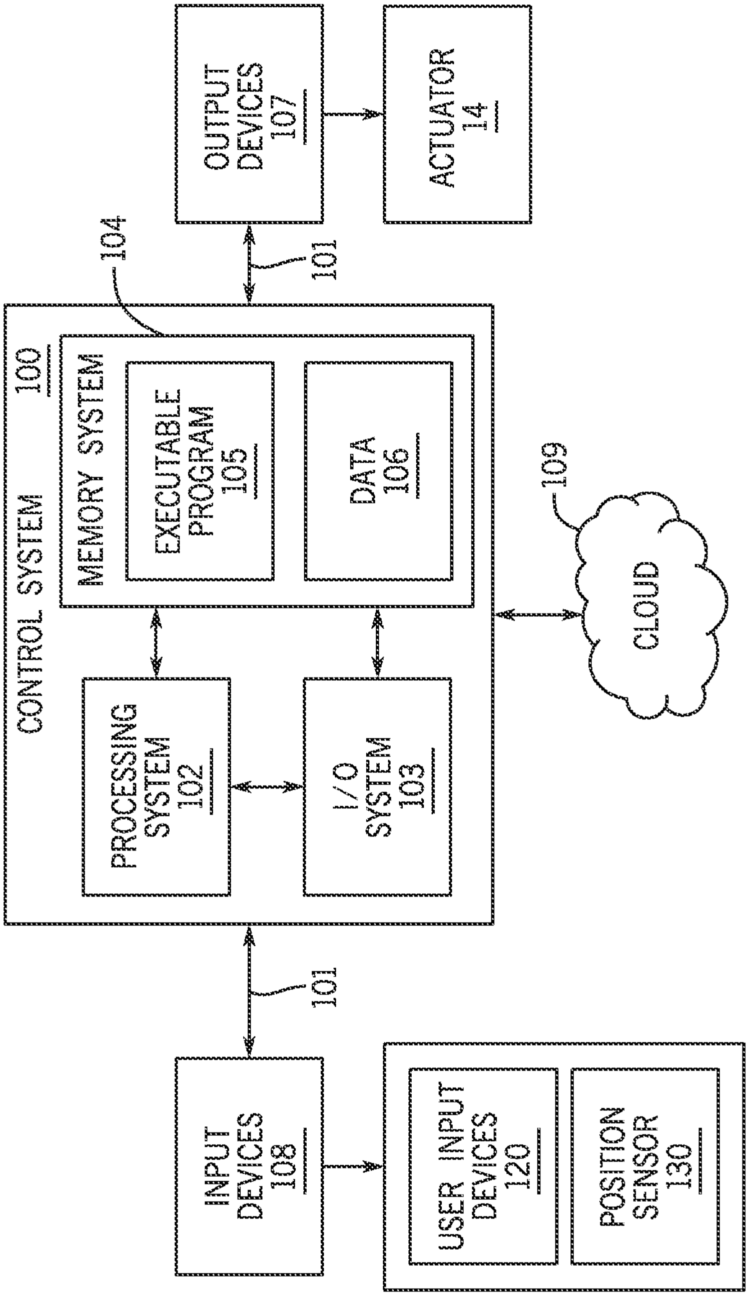
FIG. 8 is an example control system for a marine vessel according to the present disclosure.

FIG. 8 depicts an example controller or control system 100 for controlling various components of the marine vessel 4 and/or the actuators 14. The control system 100 is in communication with the actuators 14 and is configured to control operation of the actuators 14, e.g., to extend and retract the rods 20 relative to their corresponding housings 15 by providing a predetermined current and voltage to a motor of the actuator for a predetermined period of time. More specifically, the control system 100 can be configured to control a speed and a direction of the rods 20 based on sensor input signals and/or user input signals as described in greater detail herein below.

Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, and may be direct or indirect, and may follow alternate pathways.

In certain examples, the control system 100 communicates with each of the components of the marine vessel 4 and/or actuators 14 via a communication link 101, which can be any wired or wireless link. The control system 100 is capable of receiving information and/or controlling one or more operational characteristics of the marine vessel 4 and/or the actuators 14 and their various sub-systems by sending and receiving control signals via the communication link 101. In one example, the communication link 101 is a controller area network (CAN) bus; however, other types of links could be used.

It will be recognized that the extent of connections and the communication links 101 may in fact be one or more shared connections, or links, among some or all of the components of the marine vessel 4 and/or the actuators 14. Moreover, the communication link 101 lines are meant only to demonstrate that the various control elements are capable of communicating with one another, and do not represent actual wiring connections between the various elements, nor do they represent the only paths of communication between the elements. Additionally, the marine vessel 4 and/or the actuators 14 may incorporate various types of communication devices and systems, and thus the illustrated communication links 101 may in fact represent various different types of wireless and/or wired data communication systems.

The control system 100 may be a computing system that includes a processing system 102, memory system 104, and input/output (I/O) system 103 for communicating with other devices, such as input devices 108 (e.g., position sensors 130, speed sensors, user input device 120) and output devices 107 (e.g., the actuators 14), either of which systems 102, 104 may also or alternatively be stored in a cloud 109. The processing system 102 loads and executes an executable program 105 from the memory system 104, accesses data 106 stored within the memory system 104, and directs the marine vessel 4 and/or the actuators 14 to operate as described in further detail below.

The processing system 102 may be implemented as a single microprocessor or other circuitry, or may be distributed across multiple processing devices or sub-systems that cooperate to execute the executable program 105 from the memory system 104. Non-limiting examples of the processing system include general purpose central processing units, application specific processors, and logic devices.

The memory system 104 may comprise any storage media readable by the processing system 102 and capable of storing the executable program 105 and/or data 106. The memory system 104 may be implemented as a single storage device, or may be distributed across multiple storage devices or sub-systems that cooperate to store computer-readable instructions, data structures, program modules, or other data. The memory system 104 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

During operation of the marine vessel 4, the control system 100 is configured to send signals (e.g., electric control signals) to the actuators 14 to thereby cause the actuator assembly 10 to pivot the trim tabs 6 (see FIG. 1) into or out of the water. It will be understood to those skilled in the art that the control system 100 may also send signals to the actuators 14 to cause the actuators 14 to cease operation. The actuators 14 can also be configured to cease operation when no signals are received from the control system 100.

In the example of providing a command via a user input device 120, the user input device 120 sends an actuation signal to the control system 100, which in turn controls operation of the actuators 14. The user input device 120 is any device capable of receiving an input from the operator of the marine vessel 4, and in certain examples, the user input device 120 includes one or more levers, joysticks, switches, buttons, sliders, keys, touch screens, and/or the like. In certain examples, the user input device 120 may be a pair of buttons, switches, or keys. Typically, a given button, switch, or the like corresponds a given trim tab 6, of which there are typically two on the marine vessel 4. A user may input a "trim up" command via the user input device 120, in response to which the control system 100 provides power to the actuators 14 to retract the rods 20 into the housings 15. The user may input a "trim down" command via the user input device 120, in response to which the control system 100 provides power to the actuators 14 to extend the rods 20 from the housings 15.

As noted above, the control system 100 is further configured to control the actuators 14 based on sensed positions of the rods 20 in their corresponding housings 15. As such, the control system 100 advantageously is capable of independently changing the position of either rod 20 to match (or more closely match) the position of the other rod 20 by increasing or decreasing axial speed of the rods 20 and/or by moving one of the rods 20 for a longer period of time than the other rod 20. In this way, the control system 100 can match the axial positions of the rods 20 to account for manufacturing and/or operational differences between the actuators 14. The control system 100 provides such real-time automatic modification to actuator speed and/or time of actuation in accordance with the program 105 saved in the memory system 104, which defines when such modification should occur, for how long, and the speeds and/or directions for operating the actuators 14. In certain examples, the logic for automatic modification further includes considerations of other inputs or conditions such as sensed load, pressure on an actuator component, or others. The logic may be stored as an algorithm, a data table, and/or other forms within the memory system 104.

In one non-limiting example, a first position sensor 130 continuously determines the position of the first rod 20 as the first rod 20 extends or retracts. At the same time, a second position sensor 130 continuously determines the position of a second rod 20 as the second rod 20 extends or retracts. The control system 100 receives an operator input signal from the user input device 120 that corresponds to a desired position of the trim tab 6 with respect to the marine vessel 4. The control system 100 then sends one or more control signals to the actuators 14 to thereby move the rods 20 toward predetermined positions that correspond to the desired position of the trim tab 6 with respect to the marine vessel 4. Note that the correlation between the position of the trim tab 6 with respect to the marine vessel 4 and the position of the first and second rods 20 may be stored in a lookup table and/or algorithm in the memory system 104. As the first and second rods 20 are moved, the position sensors 130 provide continuous feedback on the sensed position of the first and second rods 20. The control system 100 is configured to utilize these sensed positions to adjust or modify the speed of the first and second rods 20 and/or the positions of the first and second rods 20 such that the first and second rods 20 extend to equivalent end positions. In this way, the control system 100 accounts for manufacturing and/or operational differences between the actuators 14 (e.g., one rod extends at a greater speed than the other actuator) by utilizing these sensed positions to decrease the amount of pivoting required of the brackets 40, 140, 80 to ensure equal loading of the actuators 14 (as described above). For example, the control system 100 can derivate sensed rod position over time to determine which rod 20 is moving faster than the other, and the control system 100 may then slow down the rod 20 that is moving faster.

In certain examples, each actuator 14 also includes a circuit board located in the housing 15. In these examples, the circuit board extends along a majority of the length of the housing 15. The circuit board comprises a linear inductive sensor having a linear axis oriented parallel to the rod axis 22. The linear inductive sensor is configured to sense an actual position of the end of the rod 20 that is located within the housing 15. Further details of the linear inductive sensor and the way in which it senses the position of the rod end are provided in U.S. application Ser. No. 17/716,542, incorporated by reference herein. In some embodiments, the control system 100 is configured to control the actuator 14 based on the actual position of the rod end. For example, the control system 100 can be programmed to move the rod 20 to another position by permitting the application of a given voltage and/or current for a given time in order to move the rod 20 from a present actual position to a setpoint position according to a rod positioning algorithm.

In other examples, a linear inductive sensor is not provided, and the control system 100 is instead configured to calculate the position of the rod 20 based on the prior provided voltage and/or current and time for which that voltage and/or current was applied to the actuator 14. For example, given a known starting position of the rod 20 with respect to the housing 15 (e.g., fully retracted) the control system 100 can map a current provided to the actuator 14 and a length of time the current was provided to the actuator 14, a voltage provided to the actuator 14 and a length of time the voltage was provided to the actuator 14, or both the current and voltage and length of time the current and voltage were provided to the actuator 14, to a calculated position of the rod 20.

In other examples, rather than measuring or calculating the position of the rod 20 with respect to the housing 15, the control system 100 is provided with information related to the position of the trim tab 6 with respect to the transom of the marine vessel 4. A trim sensor (also known in the art as a "trim sender") may be provided on each trim tab to sense the position of the trim tab 6. In one example, the trim sensor is a Hall Effect sensor that measures the rotational position of the trim tab 6 with respect to the transom of the marine vessel 4.

According to one example of the present disclosure, a bracket 40, 140 for coupling an actuator assembly 10, 110 having a first rod 20 and a second rod 20 to a pivotable component of a marine vessel 4 comprises a main body 42, 142 with a first end 43, 143 configured to be pivotally coupled to the first rod 20 and an opposite second end 45, 145 configured to be pivotally coupled to the second rod 20. The main body 42, 142 pivots about at least one axis 49, 149, 150 to thereby facilitate equal loading of the first rod 20 and the second rod 20. A linking member 60, 160 is pivotally coupled to the main body 42, 142 and is configured to be coupled to the pivotable component.

According to some aspects, the pivotable component is a trim tab 6.

According to some aspects, the linking member 60 is a clevis.

According to some aspects, the main body 42, 142 pivots about a first main axis 49, 149, the first end 43, 143 is coupled to the first rod 20 at a first end axis 44, 144 and the second end 45, 145 is coupled to the second rod 20 at a second end axis 46, 146. The first main axis 49, 149, the first end axis 44, 144, and the second end axis 46, 146 are parallel to and spaced apart from each other.

According to some aspects, the bracket 40 further comprises a mounting bracket 7 configured to pivotally couple the linking member 60 to the pivotable component.

According to some aspects, the at least one axis comprises two axes 149, 150, and the main body 142 pivots about the two axes 149, 150 to thereby facilitate equal loading of the first rod 20 and the second rod 20.

According to some aspects, the two axes comprise a first main axis 149 and a second main axis 150 that is transverse to the first main axis 149. The first end 143 is coupled to the first rod 20 at a first end axis 144 and the second end 145 is coupled to the second rod 20 at a second end axis 166. The first main axis 149, the first end axis 144, and the second end axis 146 are parallel to and spaced apart from each other.

According to some aspects, the first main axis 149 is perpendicular to the second main axis 150.

According to some aspects, the linking member 160 is an eyebolt.

According to another example of the present disclosure, an actuator assembly 10, 110 for pivoting a trim tab 6 of a marine vessel 4 comprises a first rod 20 and a second rod 20 configured to pivot the trim tab 6 with respect to the marine vessel 4 and a bracket 40, 140 having a main body 42, 142 with a first end 43, 143 pivotally coupled to the first rod 20 and an opposite second end 45, 145 pivotally coupled to the second rod 20. The main body 42, 142 pivots about at least one axis 49, 149, 150 to thereby facilitate equal loading of the first rod 20 and the second rod 20. A linking member 60, 160 is pivotally coupled to the main body 42, 142 and is further coupled to one of the trim tab 6 and the marine vessel 4.

According to some aspects, the actuator assembly 10, 110 includes a first housing 15 from which the first rod 20 extends and a second housing 15 from which the second rod 20 extends.

According to some aspects, the bracket 40, 140 is a first bracket and a second bracket 80 is configured to pivotally couple the first and second housings to the other of the trim tab 6 and the marine vessel 4.

According to some aspects, the linking member 60 is a clevis.

According to some aspects, the main body 42, 142 pivots about a first main axis 49, 149, the first end 43, 143 is coupled to the first rod 20 at a first end axis 44, 144 and the second end 45, 145 is coupled to the second rod 20 at a second end axis 46, 146. The first main axis 49, 149, the first end axis 44, 144, and the second end axis 46, 146 are parallel to and spaced apart from each other.

According to some aspects, the bracket 40 further comprises a mounting bracket 7 configured to pivotally couple the linking member 60 to the one of the trim tab 6 and the marine vessel 4.

According to some aspects, one or more position sensors 130 sense a first position of the first rod 20 and a second position of the second rod 20 and a control system 100 is configured to independently control movement of the first rod 20 and the second rod 20 based on the sensed first position of the first rod 20 and the sensed second position of the second rod 20.

According to some aspects, the at least one axis comprises two axes 149, 150 and the main body 142 pivots about the two axes 149, 150 to thereby facilitate equal loading of the first rod 20 and the second rod 20.

According to some aspects, the two axes comprise a first main axis 149 and a second main axis 150 that is transverse to the first main axis 149. The first end 143 is coupled to the first rod 20 at a first end axis 144 and the second end 145 is coupled to the second rod 20 at a second end axis 146. The first main axis 149, the first end axis 144, and the second end axis 146 are parallel to and spaced apart from each other.

According to some aspects, the first main axis 149 is perpendicular to the second main axis 150.

According to some aspects, the linking member 160 is an eyebolt.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bracket for coupling an actuator assembly having a first rod and a second rod to a pivotable component of a marine vessel, the bracket comprising:

a main body with a first end configured to be pivotally coupled to the first rod and an opposite second end configured to be pivotally coupled to the second rod, wherein the main body pivots about at least one axis to thereby facilitate equal loading of the first rod and the second rod;

a linking member pivotally coupled to the main body and configured to be coupled to the pivotable component; and a mounting bracket configured to pivotally couple the linking member to the pivotable component.

2. The bracket according to claim 1, wherein the pivotable component is a trim tab.

3. The bracket according to claim 1, wherein the linking member is a clevis.

4. The bracket according to claim 1, wherein the main body pivots about a first main axis;

wherein the first end is coupled to the first rod at a first end axis and the second end is coupled to the second rod at a second end axis; and wherein the first main axis, the first end axis, and the second end axis are parallel to and spaced apart from each other.

5. The bracket according to claim 1, wherein the at least one axis comprises two axes, and wherein the main body pivots about the two axes to thereby facilitate equal loading of the first rod and the second rod.

6. The bracket according to claim 5, wherein the two axes comprise a first main axis and a second main axis that is transverse to the first main axis;

wherein the first end is coupled to the first rod at a first end axis and the second end is coupled to the second rod at a second end axis; and wherein the first main axis, the first end axis, and the second end axis are parallel to and spaced apart from each other.

7. The bracket according to claim 6, wherein the first main axis is perpendicular to the second main axis.

8. The bracket according to claim 5, wherein the linking member is an eyebolt.

9. An actuator assembly for pivoting a trim tab of a marine vessel, the actuator assembly comprising:

a first rod and a second rod configured to pivot the trim tab with respect to the marine vessel; and a bracket having:

a main body with a first end pivotally coupled to the first rod and an opposite second end pivotally coupled to the second rod, wherein the main body pivots about at least one axis to thereby facilitate equal loading of the first rod and the second rod;

a linking member pivotally coupled to the main body and further coupled to one of the trim tab and the marine vessel; and a mounting bracket configured to pivotally couple the linking member to the one of the trim tab and the marine vessel.

10. The actuator assembly according to claim 9, further comprising a first housing from which the first rod extends and a second housing from which the second rod extends.

11. The actuator assembly according to claim 10, wherein the bracket is a first bracket, and further comprising a second bracket configured to pivotally couple the first and second housings to the other of the trim tab and the marine vessel.

12. The actuator assembly according to claim 9, wherein the linking member is a clevis.

13. The actuator assembly according to claim 9, wherein the main body pivots about a first main axis;

wherein the first end is coupled to the first rod at a first end axis and the second end is coupled to the second rod at a second end axis; and wherein the first main axis, the first end axis, and the second end axis are parallel to and spaced apart from each other.

14. The actuator assembly according to claim 9, further comprising:

one or more position sensors that sense a first position of the first rod and a second position of the second rod; and a control system configured to independently control movement of the first rod and the second rod based on the sensed first position of the first rod and the sensed second position of the second rod.

15. The actuator assembly according to claim 9, wherein the at least one axis comprises two axes, and wherein the main body pivots about the two axes to thereby facilitate equal loading of the first rod and the second rod.

16. The actuator assembly according to claim 15, wherein the two axes comprise a first main axis and a second main axis that is transverse to the first main axis;

wherein the first end is coupled to the first rod at a first end axis and the second end is coupled to the second rod at a second end axis; and wherein the first main axis, the first end axis, and the second end axis are parallel to and spaced apart from each other.

17. The actuator assembly according to claim 16, wherein the first main axis is perpendicular to the second main axis.

18. The actuator assembly according to claim 15, wherein the linking member is an eyebolt.

* * * * *